United States Patent [19]
Wilson

[11] Patent Number: 4,534,293
[45] Date of Patent: Aug. 13, 1985

[54] COILED CURVILINEAR SOLID PROPELLANT GRAIN

[75] Inventor: Ben F. Wilson, Huntsville, Ala.

[73] Assignee: The United States of America as represented by the Secretary of the Army, Washington, D.C.

[21] Appl. No.: 667,315

[22] Filed: Nov. 1, 1984

[51] Int. Cl.³ .............................................. C06D 5/06
[52] U.S. Cl. .................................... 102/289; 102/290; 102/291
[58] Field of Search .................. 102/289, 290, 291

[56] References Cited

U.S. PATENT DOCUMENTS

| | | | |
|---|---|---|---|
| 3,347,047 | 10/1967 | Hartz et al. | 102/290 X |
| 3,855,176 | 12/1974 | Skidmore | 102/291 X |
| 3,973,397 | 8/1976 | Chase et al. | 102/290 X |
| 4,209,351 | 6/1980 | Pierce et al. | 102/290 X |
| 4,429,634 | 2/1984 | Byrd et al. | 102/290 |

Primary Examiner—Peter A. Nelson
Attorney, Agent, or Firm—Anthony T. Lane; Robert P. Gibson; James T. Deaton

[57] ABSTRACT

A curvilinear solid propellant gas generator which includes a housing that has a diameter or width that is larger than the length of the gas generator and with a curvilinear solid propellant grain mounted therein to provide a long burning time propellant with a short length housing.

7 Claims, 2 Drawing Figures

COILED CURVILINEAR SOLID PROPELLANT GRAIN

DEDICATORY CLAUSE

The invention described herein may be manufactured, used, and licensed by or for the Government for governmental purposes without the payment to me of any royalties thereon.

BACKGROUND OF THE INVENTION

In the past, long burning solid propellant grains have been linear grains that are long straight sections in order to provide the required burning time. For instance, an end burning grain to burn 90 seconds at 0.2 inches per second requires a length of 18 inches. It is not always possible to have a long length of space to mount a long burning solid propellant and therefore there is a need for a solid propellant that will burn for a long length of time yet can be stored in a relatively short section.

Therefore, it is an object of this invention to provide a solid propellant grain that can be stored and burned in a short housing in relation to the overall width or diameter of the housing.

Another object of this invention is to provide a solid propellant grain that is curvilinear in shape.

Still another object of this invention is to provide a solid propellant grain that can be made of any of the conventional castable gas generator propellants.

Other objects and advantages of this invention will be obvious to those skilled in this art.

SUMMARY OF THE INVENTION

In accordance with this invention, a solid propellant grain is provided that is curvilinear in shape and of a length that it can be burned for a long time by providing an inhibitor around the circumference of the propellant and at one end so that the propellant burns from only one end of the curvilinear structure. By providing this shape, the solid propellant is easily mounted in a structure that is greater in diameter or width than the overall length of the gas generator structure. This allows the solid propellant grain to be easily packaged within a tank or other structure that does not have a long space in which to mount the solid propellant grain.

DESCRIPTION OF THE PREFERRED EMBODIMENT

Figure 1:
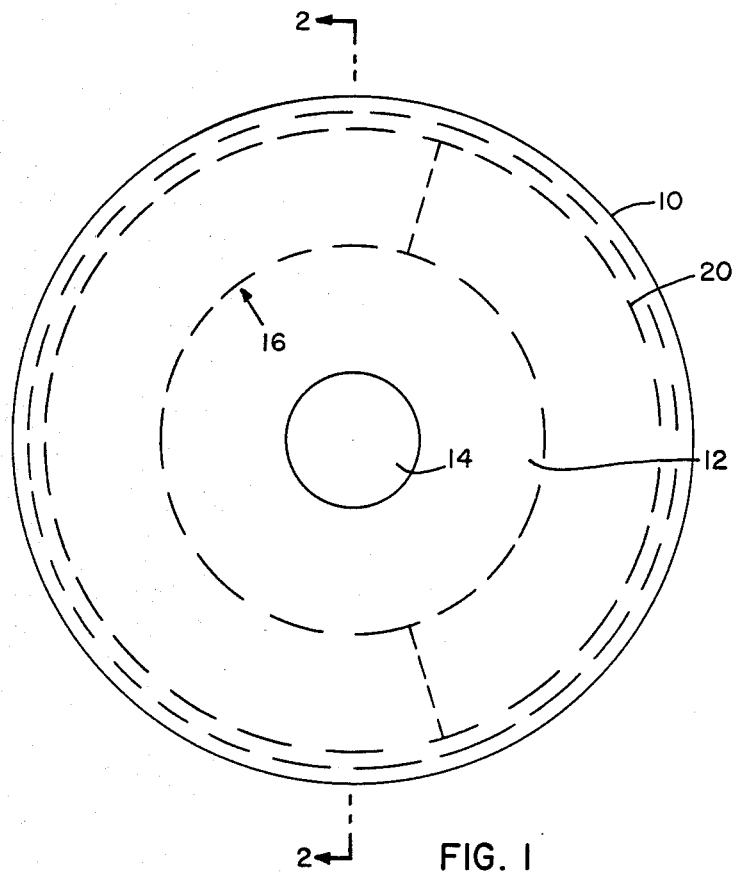
FIG. 1 is an end view of a rocket motor case with a curvilinear solid propellant grain mounted therein.
Figure 2:
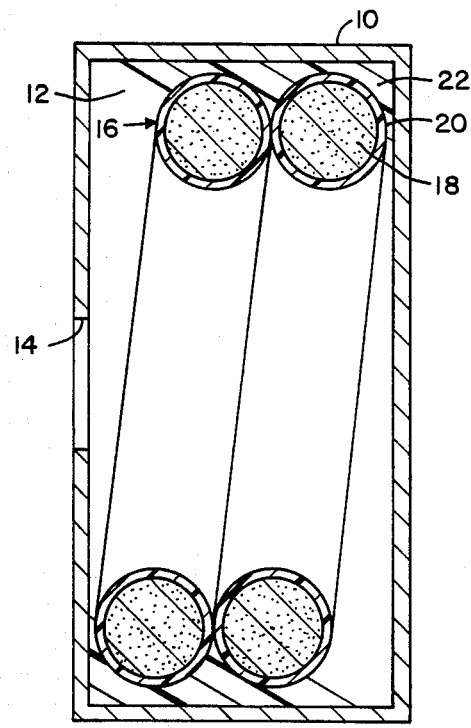
FIG. 2 is a sectional view along line 2—2 of FIG. 1.

Referring now to the drawings, a housing 10 defines a chamber 12 therein and an outlet opening 14 in one wall for exhausting gas from chamber 12. Internally of housing 10 and mounted in chamber 12 is a curvilinear solid propellant grain 16 that includes an end burning solid propellant grain 18 and a liner inhibitor 20. Inhibitor 20 covers all the outer surface of solid propellant grain 18 except at one end which is designed for the end from which the solid propellant is to burn. Curvilinear solid propellant grain 16 is secured in housing 10 such as by bonding means 22 or by other conventional mechanical means for clamping or securing curvilinear solid propellant grain 16 in place inside housing 10. Bonding means 22 is preferably a combination of an insulator and adhesive material that are compatible with the inhibitor liner material 20 and solid propellant 18. Solid propellant 18 can be any case-bonded propellant system that is commonly used in the art and these include those with ammonium perchlorate oxidizer with a hydroxy-terminated polybutadiene polymer system, those with ammonium nitrate oxidizer with a hydroxy-terminated polybutadiene polymer system, those with nitro-amine propellant system, and etc. The liner inhibitor 20 functions to control the burning surface of the propellant and confine it to burning from one end and to serve to affect a bond between the solid propellant and its inert container. The particular liner inhibitor 20 chosen for a specific propellant composition 18 must be compatible with the particular propellant composition system. For a hydroxy-terminated polybutadiene polymer system, the liner inhibitor can be a hydroxy-terminated polybutadiene polymer system that is filled with carbon. Obviously, other liner inhibitor compositions can also be used. The curvilinear solid propellant grain 16 as provided herein can obviously be packaged into a short space and formed to meet the existing space which is a very desirable trait in many applications. Normally, conventional linear grains require a long straight section to package the grain in. For instance, an end burner required to burn 90 seconds at 0.02 inch per second requires a length of 18 inches. The conventional end burn requires 18 inches of straight section. By providing a curvilinear grain as disclosed herein, a grain of this length can be packaged in a coil approximately 6 inches in diameter with a length of one and one-half inches for the container. This provides for a much more compacted arrangement.

With a curvilinear solid propellant grain as provided by applicant, one end of the propellant is exposed to permit a controlled burning when initiated with a conventional ignitor. The propellant grain is contained within housing 10 which serves as a pressure vessel that will contain the gas generated from the solid propellant and provide for a controlled use of the gas produced. The burning rate of the solid propellant and consequently the mass of gas generated depends upon the composition of the particular solid propellant used and the pressure within the pressure vessel or housing 10. The curvilinear solid propellant grain in accordance with this invention can be used on any long burn time application. One such application is a gas generator for a liquid engine using positive expulsion. The curvilinear solid propellant grain can be packaged in a short section of the cylindrical tank, separated from the liquid to be expelled by a conventional piston or bladder. One application is a gas generator for the expulsion system of a mono-propellant liquid propulsion system engine in which an operating time in excess of 90 seconds is required or desired.

In operation, with housing 10 mounted as desired, one end of curvilinear solid propellant grain 16 is ignited at the exposed solid propellant and the solid propellant burns to produce gas that is exhausted through opening 14 until solid propellant 18 is completely burned out.

I claim:

1. A curvilinear solid propellant gas generator comprising a gas generator housing having a chamber defined therein, said gas generator housing and said chamber having a length which is less than the width thereof, a curvilinear solid propellant grain that includes an end burning solid propellant that is encompassed by a liner inhibitor and being mounted as a coiled curvilinear structure in a fixed position in said gas generator housing to provide said gas generator housing that has a length that is less than the width thereof to provide a compact gas generator arrangement with a long burning end grain type propellant.

2. A curvilinear solid propellant gas generator as set forth in claim 1, wherein said means securing said curvilinear solid propellant grain to said housing includes a combination insulator and adhesive bonding means that bonds the liner inhibitor with the solid propellant therein to said housing in a fixed relation.

3. A curvilinear solid propellant gas generator as set forth in claim 1, wherein said housing has a diameter that is approximately four times the length of the housing.

4. A curvilinear solid propellant gas generator as set forth in claim 1, wherein said liner inhibitor is a hydroxy-terminated polybutadiene polymer system that is filled with carbon.

5. A curvilinear solid propellant gas generator as set forth in claim 4, wherein said end burning solid propellant includes an ammonium perchlorate oxidizer and a hydroxy-terminated polybutadiene polymer system.

6. A curvilinear solid propellant gas generator as set forth in claim 1, wherein said curvilinear solid propellant grain is coiled to define at least one complete revolution.

7. A curvilinear solid propellant gas generator as set forth in claim 3, wherein said curvilinear solid propellant grain is coiled to define two complete revolutions.

* * * * *